United States Patent [19]

Dunlavy

[11] Patent Number: 5,297,201
[45] Date of Patent: Mar. 22, 1994

[54] SYSTEM FOR PREVENTING REMOTE DETECTION OF COMPUTER DATA FROM TEMPEST SIGNAL EMISSIONS

[75] Inventor: John H. Dunlavy, Colorado Springs, Colo.

[73] Assignees: J.D. Technologies, Inc., Colo.; Haynes and Boone, L.L.P., Dallas, Tex.; Feferman & Rehler, L.L.P., Corpus Christi, Tex.

[21] Appl. No.: 960,532

[22] Filed: Oct. 13, 1992

[51] Int. Cl.$^5$ .......................... H04K 1/02; H04K 3/00
[52] U.S. Cl. ........................................... 380/6; 455/1
[58] Field of Search ........................... 380/6, 8; 455/1; 342/14

[56] References Cited

U.S. PATENT DOCUMENTS

| | | |
|---|---|---|
| 2,476,337 | 7/1949 | Varian . |
| 3,897,591 | 7/1975 | Lundstrom et al. . |
| 4,841,569 | 6/1989 | Wachob . |
| 4,932,057 | 6/1990 | Kolbert . |
| 5,032,839 | 7/1991 | Even-Or . |
| 5,036,323 | 7/1991 | Cain et al. . |
| 5,086,467 | 2/1992 | Malek . |
| 5,153,921 | 10/1992 | Kawarabayashi . |
| 5,165,098 | 11/1992 | Hoivik ................................. 380/8 |

FOREIGN PATENT DOCUMENTS 0240328 10/1987 European Pat. Off. .

Primary Examiner—Stephen C. Buczinski
Attorney, Agent, or Firm—Warren B. Kice

[57] ABSTRACT

A system for preventing the remote detection and decoding of computer data from RF or conducted signal emissions is disclosed. A simulator is coupled to the computer for emulating signal emissions in order to mask the computer signal emissions. The simulator includes an emulation generator coupled to the computer to radiate signals that fully emulate those radiated by the computer to be protected. The emulated signal emissions are synchronized with the computer signal emissions by a special control unit which receives timing instructions from the computer. A random sequence generator randomizes and convolutes the sequence of the emulated signal emissions so that the composite signal emissions formed by the computer and the simulator cannot be decoded to render meaningful data indicative of that being processed by the computer. The simulator is coupled with a computer to be protected by connection to the I/O interface port of the computer.

19 Claims, 2 Drawing Sheets

SYSTEM FOR PREVENTING REMOTE DETECTION OF COMPUTER DATA FROM TEMPEST SIGNAL EMISSIONS

TECHNICAL FIELD

The invention relates to computer security systems and particularly to such a system for preventing remote detection of computer data from computer signal emissions, referred to as Tempest emissions, by generating randomized signal emissions to mask the signal emissions of the computer.

BACKGROUND OF THE INVENTION

Electronic data processing (EDP) equipment such as main-frame computers, minicomputers, personal computers (PCs), word processors and related devices radiate electronic or electromagnetic radio frequency (RF) signals known as Tempest emissions. The term Tempest originates from the name of a government program concerned with the study and control of spurious electronic signals emitted from computers. Tempest emissions typically occur at several different frequencies within the range of a few kilohertz (KHz) to several hundred megahertz (MHz), and are often of sufficient strength and intensity to be received at distances exceeding several hundred meters. Within this reception range, it is possible, using sophisticated receiving and signal processing equipment, to receive and decode Tempest emissions to reveal the original information or data being processed by the source computer. Thus, signal emissions from computers are vulnerable to being received at considerable distances and decoded by unauthorized persons possessing appropriate equipment. Since computers are frequently used to process information that must be kept secret for defense, political or commercial reasons, such signal emissions are of concern to those wishing to protect sensitive data.

Awareness of the ability to remotely receive and decode computer signal emissions in order to obtain computer data has existed since the early 1960's. Both federal government agencies and private entities have expended considerable effort in attempting to protect computer data from unauthorized access through such signal emissions. One method used to protect computer data is to employ electromagnetic shielding which reduces the level of the signal emissions emanating from the computer, thus preventing effective reception at reasonable distances. Such shielding typically takes the form of a metal shield which encases the individual components of the computer, particularly the the central processing unit (CPU), video display unit (VDU), and all interconnect cables. The shield is used in conjunction with an effective AC power-line filter. The AC power-line filter is used to prevent signal emissions generated by the computer from being conducted along the AC power line and thereafter being intercepted by what is referred to as the "AC conduction mode." Where multiple, co-located computers require protection, they are often placed within a shielded-room or "vault" which incorporates a specially-designed shielded door that must be kept closed when sensitive information is being processed.

The available arrangements for shielding EDP equipment are unsatisfactory for many reasons. Shielded rooms are expensive to build and require considerable time for installation. As a practical matter, the doors of shielded rooms are seldom kept closed because of inconvenience factors and because they are difficult to open and close as a result of their weight and the close tolerances needed for an effective RF seal. Individually shielded computers are relatively expensive when compared to those without shielding. Further, certification-testing is required to verify the effectiveness of the shielding to contain the signal emissions. The sensitivity of antennas and receivers of the type that might be employed to receive computer signal emissions have improved sufficiently to render ineffective most available shielding arrangements.

Other attempts to prevent data detection from computer signal emissions involve generating a sufficiently intense, broad band, random-noise type of emission in close physical proximity to the computer in an effort to mask the signal emissions. However, these configurations typically violate Federal Communications Commission (FCC) regulations pertaining to stray radio frequency emissions, and further provide little protection against the unauthorized recovery of data from computer signal emissions detected using sophisticated receiving and advanced signal-processing technologies.

SUMMARY OF THE INVENTION

The foregoing problems are solved and a technical advance is achieved by method and apparatus of the present invention for preventing the remote detection and decoding of signal emissions from a computer by generating coherent signal emissions in proximity with the computer which mask those of the computer. In a departure from the art, a signal masking technique is employed in which circuitry is coupled to the computer to radiate signals that fully emulate those radiated by the computer to be protected. The emulated signal emissions are synchronized with the computer signal emissions by a special control unit which receives timing instructions from the computer. The emulated signal emissions are synchronized to those of the computer with respect to time, amplitude and frequency. The emulated signals are also randomized or convoluted so that the composite signal emissions formed by the computer and the invention cannot be decoded to render meaningful data indicative of that being processed by the computer.

In a preferred embodiment, a simulator is coupled with a computer to be protected by connection to the I/O interface port of the computer. The simulator includes an emulation generator comprising circuit components substantially the same as those of the computer to be protected. These components typically include the main processor circuitry and video display unit (VDU) circuitry, with or without the cathode ray tube (CRT). The processor circuitry of the emulation generator includes a control unit which receives timing signals from the I/O interface of the computer. The control unit utilizes the received timing signals to conduct processing activity which generates signal emissions synchronized with the processing activity and hence signal emissions of the computer. Since the circuit components relevant to generating signal emissions are identical in the simulator to the components of the computer, the emulated signals are closely matched and coherent with those of the computer, in addition to being fully synchronized. This makes the composite signal emissions difficult to distinguish and separate for decoding purposes. A random sequence generator is included as part of the simulator to scramble the sequence of emulated signal emissions, rendering the composite signal meaningless for the purpose of discovering the original data.

In one embodiment, the simulator also includes a broad band amplifier and antenna connected to the emulation generator for increasing the amplitude of the emulated signal emissions, thereby more closely matching them to those of the computer in the formation of the composite signal.

In another embodiment, the simulator is used in cooperation with a personal computer (PC). The components of the simulator match the relevant components of the PC, including the main processor board of the electronic data processor (EDP) unit, the video circuitry of the video display unit (VDU) and the drive components of the PCs disk drive. The randomizing function for the emulation signal emissions is performed by a randomizing program executed on the simulator's processing circuitry from the simulator's drive.

In another embodiment for a PC environment, the simulator circuitry is incorporated within the components of a PC. A simulator processor card is received in an expansion slot of the PC and a video card is incorporated within the PCs VDU. The randomizing function for the emulation signal emissions is also performed by a randomizing program executed on the simulator processing circuitry from the simulator drive.

An important technical advantage achieved with the invention is the elimination of ineffective or inefficient shielding previously used in performance of the computer security function.

Another technical advantage achieved with the invention is that emulation signal emissions which are both randomized in sequence and synchronized with the computer signal emissions result in a composite signal which is very effective to prevent decoding to obtain computer data.

DETAILED DESCRIPTION

Figure 1:
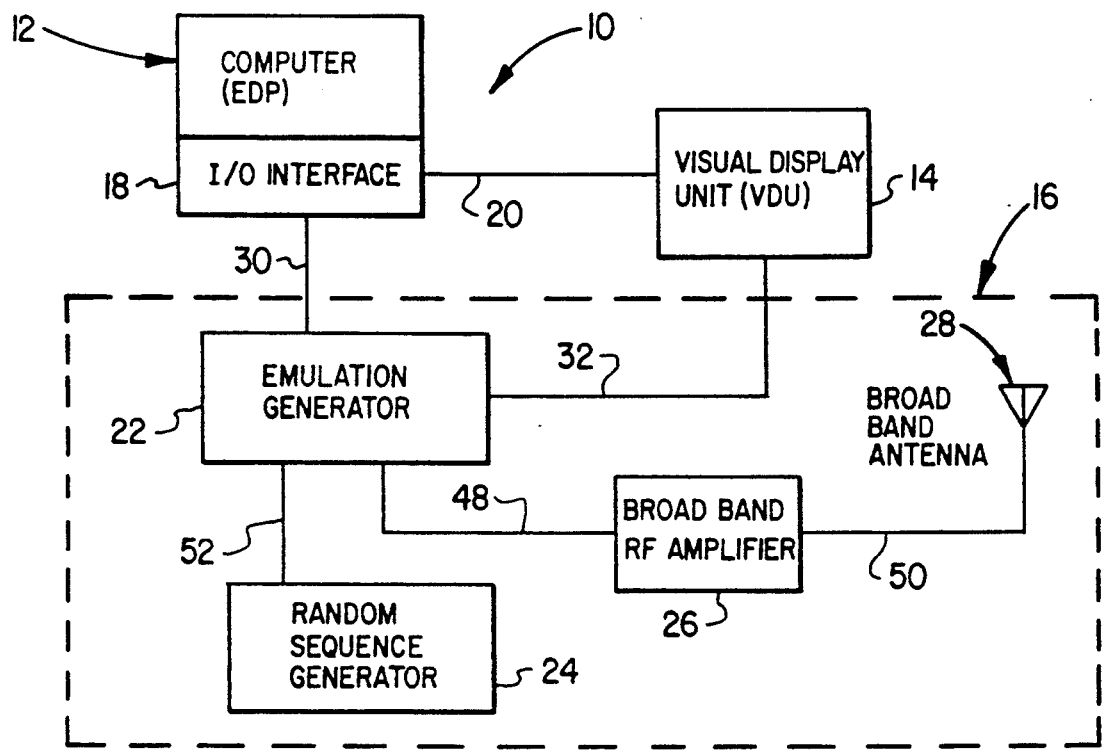
FIG. 1 is a functional block diagram illustrating a computer signal emission simulator of the present invention used in connection with a computer.

In FIG. 1, the reference numeral 10 designates a system for preventing remote detection of computer data from Tempest signal emissions. The system 10 includes an electronic data processor (EDP) 12, a visual display unit (VDU) 14 and a signal emission simulator 16. Electronic or electromagnetic signal emissions (not shown) are generated by the EDP 12 and the VDU 14 which are of the type referred to as Tempest emissions. These signal emissions are subject to reception and decoding by remote equipment (not shown) for the purpose of unauthorized discovery of the data being processed by the EDP 12. According to the invention, the signal emission simulator 16 generates randomized signal emissions for the purpose of masking the signal emissions of the EDP 12. The signal emissions of the EDP 12 and the randomized signal emissions of the simulator 16 form a composite signal from which no intelligible data of the EDP can be retrieved by remote equipment.

The EDP 12 includes an input/output (I/O) interface 18 for transferring data to and from the EDP through one or more serial or parallel data ports (not shown). A cable 20 connects the I/O interface 18 to the VDU 14. While not shown, it is understood that the EDP 12 includes a central processing unit (CPU), main memory, control and clocking components and other conventional components mounted on an internal printed circuit board (PCB). Also not shown, it is understood that the EDP 12 may be connected through the I/O interface 18 to one or more standard internal or peripheral devices, such as a hard disk drive, floppy disk drive or keyboard. Since the foregoing components are conventional, they are not described in further detail.

Tempest signal emissions from the EDP 12 and VDU 14 containing decodable data may comprise many types of signals. The signals include carrier and modulation type signals radiated at the fundamental, harmonic and subharmonic frequencies of the clock circuits (not shown) of the EDP 12. Broad band RF signals are also radiated from the EDP 12 by the digital switching of voltage and current levels within the circuitry of the CPU and memory (not shown) during periods when data is being processed, stored or retrieved. Because switching times are relatively short, the spectrum within which this type of radiation takes place is usually limited to frequencies exceeding about 1 MHz. Relatively narrow-band RF signals are radiated from the raster circuitry (not shown) of the VDU 14, mostly in the spectrum below about 1 MHz. Broad band RF signals are produced by the video information circuitry (not shown) of the VDU 14, especially those emanating from the modulated high voltage circuits feeding the cathode ray tube (also not shown) of the VDU, in the frequency range of several KHz to over 100 MHz. Additionally, conducted RF signals are produced from electrical currents that flow along remote AC power lines (not shown) connected to the EDP 12, these signals usually being limited to a frequency range lower than a few MHz.

Figure 2:
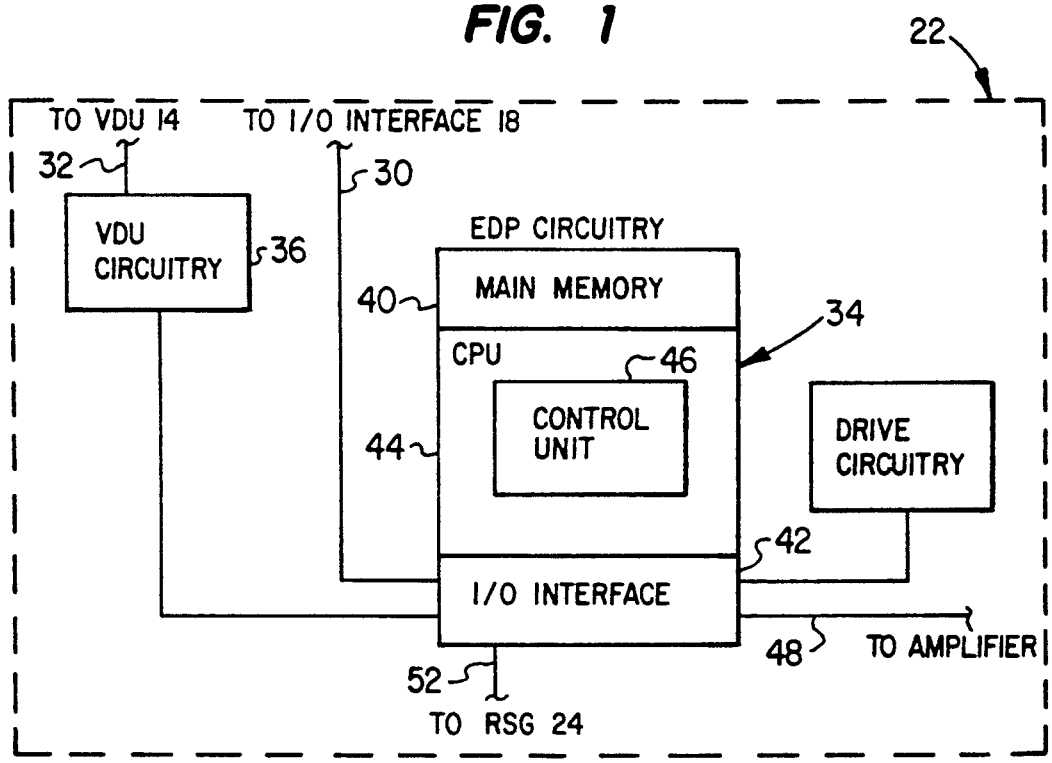
FIG. 2 is a functional block diagram illustrating details of the emulation generator of FIG. 1.

Referring to FIGS. 1 and 2, the signal emission simulator 16 includes an emulation generator 22, a random sequence generator 24, a broad band RF amplifier 26 and a broad band antenna 28. A cable 30 connects the generator 22 to the interface 18 of the EDP 12. A cable 32 connects the generator 22 to the VDU 14. While not shown, the cable 32 and the cable 20 may be connected to the VDU 14 using a T-connector. The cables 20, 30 and 32 are shielded. As discussed below, the simulator 16 generates signal emissions to mask those of the EDP 12 and VDU 14. The generated signal emissions are synchronized to those of the EDP 12 with respect to amplitude, time and frequency, and then are randomized in their sequence.

The emulation generator 22 comprises the same circuit components as those used within the EDP 12 and the VDU 14 for processing digital or analog signals related to data that is to be protected from detection. The generator 22 includes an EDP circuit module 34, a VDU circuit module 36 and a drive circuit module 38. Lines 37 and 39 connect the module 36 and the module 38 to the module 34, respectively. The EDP circuit module comprises a printed circuit board substantially similar in components to the main PCB of the EDP 12, including a main memory 40, an I/O interface 42 and a central processing unit (CPU) 44. The components of the module 34 generate signal emissions which emulate those of the EDP 12. A control unit 46 is included in the CPU 44 of the module 34 for synchronizing the signals generated by the module 34 with those of the EDP 12. The control unit is discussed further below.

The VDU circuitry module 36 includes the same circuitry as that of the VDU 14, but does not include a CRT or other displayscreen. The drive circuitry module 38 includes the same circuitry as the particular drive (not shown) connected to the EDP 12.

The generator 22 is connected to the I/O interface 18 of the EDP 12 by the line 30 in order to receive a continuous sequence of timing signals ("clocking" signals) of specified duration and frequency used in controlling the processing activity within the EDP 12. The control unit 46 of the module 34 receives the clocking signals through the I/O interface 42 and utilizes the clocking signals to synchronize the processing activity of the generator 22 with that of the EDP 12. The control unit 42 then produces control signals which regulate the generator 22 and create the synchronized signal emissions. The control unit 42 synchronizes its processing activity with the EDP 12 by receiving the clocking signals on the line 30 in a phase-locked loop (PLL) circuit.

The generator 22 is connected to the VDU 14 by the line 32 so that the generator can receive signals from the VDU. The VDU circuitry 36 must be identical to that of the VDU 14 and preferably synchronized to it in order to radiate the same spectrum after convolution.

As just described, the emulation generator 22 produces synchronized signal emissions containing substantially the same amplitude and frequency components with respect to time as those of the EDP 12, by receiving the clocking signals of the EDP 12 in the control unit 46. The control unit 46 enables performance of processing on the VDU, EDP and drive circuitry modules 36, 36 and 38 which include the same circuit components as the EDP 12 and and the VDU 14. The generator 22 thus emulates, in a coherent and synchronous manner, the signal emissions of the EDP 12 with respect to important components of those signals that would contain any meaningful data.

The broad band amplifier 32 is connected to the I/O interface 42 of the generator 22 by a line 48. The possible alternate amplifier 26 is connected to the alternate antenna 28 by a line 50. The amplifier 32 and antenna 28 in combination provide additional signal amplitude to the signal emissions of the generator 22. For some applications, this alternate approach may be useful to increase the "noise" of the masking signal emissions so that the composite signal emissions of the EDP 12 and the simulator 16 are more closely matched, making it more difficult to detect and separate the EDP signal emissions. It may also be advantageous to use the amplifier 26 to adjust the amplitude components of the simulator signal emissions so that the amplitude components of the simulator dominate those of the EDU signal emissions within both the time and frequency domains.

The random sequence generator 24 of the simulator 16 is connected to the generator 22 by a line 52. The generator 24 convolutes or "scrambles" the sequence of the signals generated by the generator 22, so that they would be meaningless if decoded. This is important since the generator 22 has just generated synchronous signals with the same character signatures as the EDP 12. The random sequence generator 24 comprises a circuit that operates as a noise source for introducing random or pseudo-random noise signals to the signals produced by the generator 22. The resulting signals are thereby convoluted in sequence, time, frequency and-/or amplitude and thus garble any data that might have been decodable from the signals.

The generator 24 comprises a random sequence generator circuit. Since such a circuit is familiar to those skilled in the art, it is not described further.

Alternatively, the generator 24 comprises a specially-written computer program contained on a suitably shielded storage medium such as a hard disk or continuous tape, which is then run on the drive circuitry 38. The program may also be stored in the ROM BIOS (not shown) of the generator 22. Such a program must also produce the equivalent of a random or psuedo-random digital sequence in order to be effective.

In operation, the system 10 prevents unauthorized access to data being processed by the EDP 12 by remote detection of signal emissions. The emulation generator 22 receives timing signals from the I/O interface of the EDP 12 on the line 30. The timing signals are received by the control unit 46 of the module 34 through the I/O interface 42. The control unit 46 uses the timing signals to provide the internal clocking functions of the generator 22 and synchronize the processing activity of the generator 22 with that of the EDP 12. Because the modules 34, 36 and 38 of the generator 22 include identical circuit components to those of the EDP 12 and the VDU 14, and because the processing activity of the generator 22 is synchronized with that of the VDU, the simulator 16 produces signal emissions containing substantially the same amplitude and frequency components with respect to time as the signal emissions of the VDU. The amplifier 26 further is utilized to adjust the amplitude components of the simulator signal emissions to match those of the EDP signal emissions.

The random sequence generator 24 randomizes the sequence of the signal emissions of the generator 22 so they would be meaningless if decoded. The signals are either randomized or pseudo-randomized. The result is that the simulator 16 produces incoherent signal emissions that overlay or mask the EDP signal emissions to produce composite signal emissions which are not readily decoded. Because the simulated signal emission component is synchronized with the EDP signal emission component, and because the simulated signal emission component is randomized, the resulting composite signal emissions are not readily capable of being separated and decoded to recover meaningful data, even with sophisticated equipment.

Figure 3:
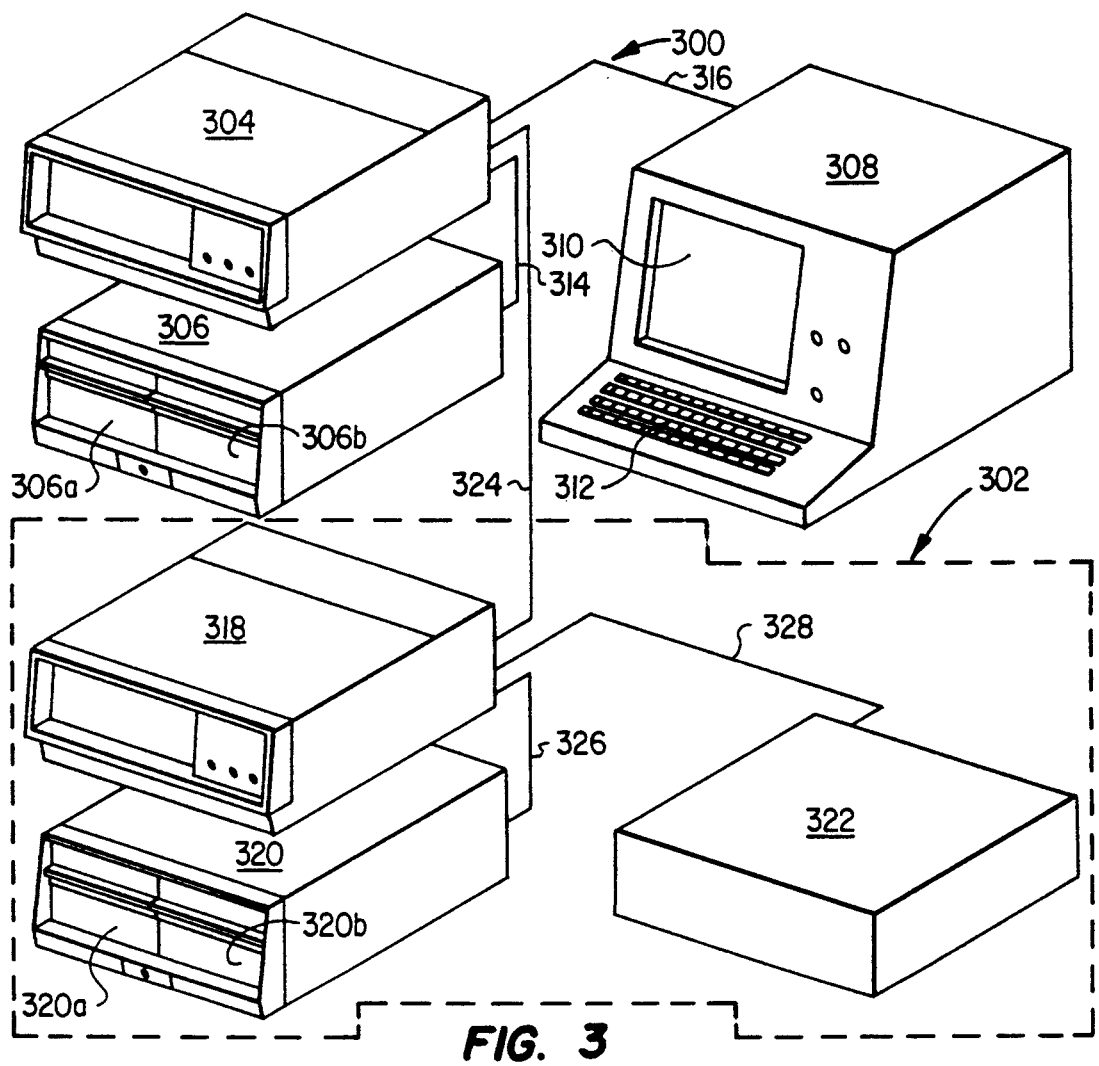
FIG. 3 is a perspective view illustrating an embodiment of the computer signal emission simulator of FIG. 1 used in connection with a personal computer (PC)

FIG. 3 illustrates an embodiment of the present invention comprising a personal computer (PC) 300 coupled to a signal emission simulator 302. The PC 300 includes an electronic data processor (EDP) 304, a disk drive 306 and a display and keyboard complex 308. The complex 308 includes a display screen 310 comprising a cathode ray tube (CRT) and internal circuitry (not shown), and a keyboard 312. The drive includes a hard disk drive 306a and a floppy disk drive 306b. A line 314 connects the drive 306 to an I/O port (not shown) of the EDP 304. A line 316 connects the complex 308 to an I/O port (not shown) of the EDP 304.

The signal emission simulator 302 includes an EDP circuitry module 318, a drive circuitry module 320 and a video circuitry module 322. A line 324 connects the module 318 to an I/O interface port (not shown) of the EDP 304. A line 326 connects the module 320 to an I/O interface port (not shown) of the module 318. A line 328 connects the module 322 to an I/O interface port (not shown) of the module 318.

The module 318 is the same as the EDP circuitry module 34 previously described with respect to FIG. 2. The circuitry of the module 318 matches that of the EDP 304, except the module 318 contains a control unit (not shown) similar to the control unit 46 of FIG. 2, for synchronizing the processing functions of the module 318 with the processing functions of the EDP 304. The module 320 is the same as the drive circuitry module 38 of FIG. 2 and matches the components of the drive 306. The module 320 includes a hard disk drive 320a and a floppy disk drive 320b. The drive module 320 may be utilized to run a specially-suited computer program (not shown) for performing the randomizing function previously described. The module 322 is the same as the module 36 of FIG. 2, and includes circuit components that match those of the complex 308. The module 322 does not include a cathode ray tube or keyboard, however.

The system of FIG. 3 operates in substantially the same manner as described with reference to FIGS. 1 and 2 for preventing remote detection of data from signal emissions of the PC 300. In this embodiment, no broad band amplifier or antenna for the simulator 302 are shown, although these components may be added, if required. The randomizing function of the simulator 302 is performed by a computer program in the module 320, as stated above.

Figure 4:
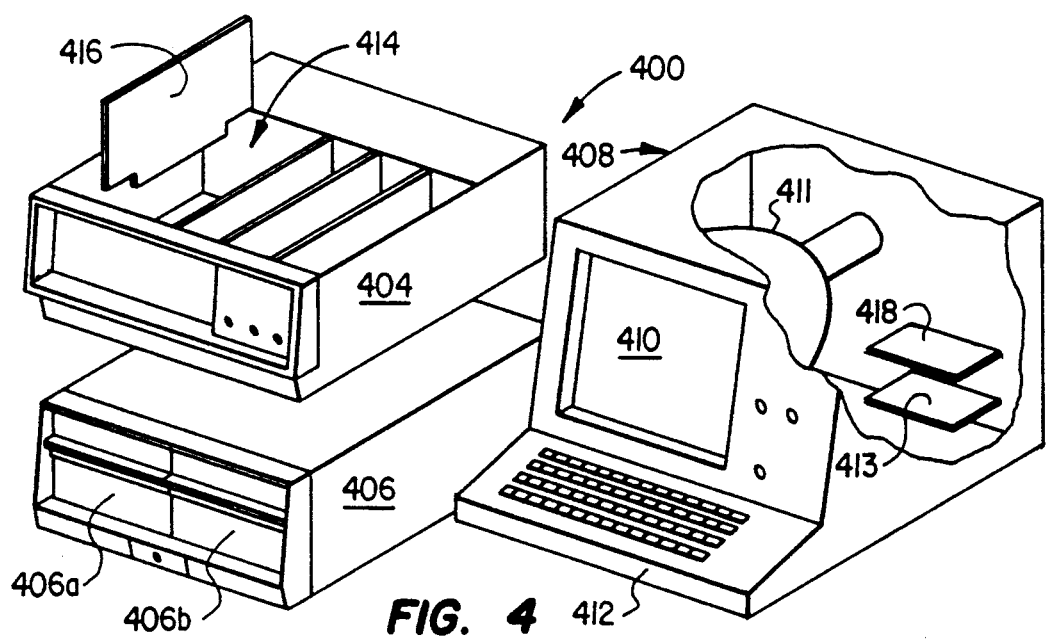
FIG. 4 is a perspective view illustrating another embodiment in which components of the simulator of FIG. 1 are located within a PC.

FIG. 4 illustrates another embodiment of the present invention comprising a PC 400 which has been modified to prevent remote detection of computer data. The PC 400 includes an electronic data processor (EDP) 404, a disk drive 406 and a display and keyboard complex 408. The complex 408 includes a display screen 410 comprising a cathode ray tube (CRT) 411 and internal circuitry 413, and a keyboard 412. The drive 406 includes a hard disk drive 406a and a floppy disk drive 406b. While not shown, it is understood that lines interconnect the components of the PC 400 in a manner similar to that described with reference to FIG. 3.

The EDP 404 includes an expansion slot 414 for receiving an emulation generator card 416. The card 416 is a printed circuit board (PCB) comprising circuitry similar to that of the main board (not shown) of the EDP 404. The card 416 performs the same functions as the EDP circuitry module 34 of FIG. 2, and also includes a control unit (not shown) capable of synchronizing the processing functions of the card 416 with those of the EDP 404. The complex 408 is equipped with a circuit board 418 consisting of circuitry similar to the circuitry 413, the board 418 performing the same functions as the module 36 of FIG. 2. The randomizing function of the invention may be performed by either a random bit generator or a special program (not shown) running in one of the drives 406a or 406b, which is not being used for the primary processing functions of the PC 400.

The present invention as described with reference to FIGS. 1-4 offers several advantages over previous signal emission detection prevention arrangements. For example, the use of relevant duplicate circuitry to simulate signal emissions is relatively inexpensive when compared to using shielded rooms or shielded PC's. In addition, the generation of composite, synchronized and randomized signal emissions provides an ideal countermeasure to advanced receiving and signal-processing technologies. Because the simulated signal emissions are matched with respect to amplitude components in both the frequency and time domains of the computer's signal emissions, their superposition makes them difficult to separate for the purpose of decoding meaningful data. Also, the simulated signal emissions have an added advantage in that they do not violate FCC regulations regarding stray RF emissions.

It is understood that variations may be made in the present invention without departing from the spirit or scope of the invention. For example, the invention may be used to prevent signal emission detection from any type of computer, computer peripheral or other type of electronic device. The components of the signal emission simulator may be alternately configured in varying combinations of separate or integrated components, all of which together perform the necessary functions. Further, alternative arrangements may be provided of the control unit receiving clocking signals from the computer to synchronize the generation of simulated signals with those of the computer. Also, the emulated signal emissions may be synchronized with the signal emissions of the computer with respect to one or any combination of time, frequency and amplitude parameters.

Other modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. Apparatus for preventing the remote detection and decoding of signal emissions from a data processor to discover data being processed by said data processor, said apparatus comprising:
   means coupled with said data processor for generating signal emissions which emulate said data processor signal emissions, said generated signal emissions having identical spectral signatures with respect to amplitude and frequency components versus time as said data processor signal emissions, said generating means comprising circuitry which is identical to circuitry of said data processor that produces emissions containing said data processor data;
   control means coupled with said generating means for synchronizing said generated signal emissions with said data processor signal emissions; and
   means coupled with said generating means for randomizing said generated signal emissions, said generated signal emissions and said data processor signal emissions together producing a composite signal which is not decodable to discover said data processor data.

2. The apparatus of claim 1 further comprising interface means coupled with said control means for receiving timing signals from said data processor for providing said synchronization.

3. The apparatus of claim 1 wherein said generated signal emissions are synchronized with said data processor signal emissions with respect to time.

4. The apparatus of claim 1 wherein said generated signal emissions are synchronized with said data processor signal emissions with respect to frequency.

5. The apparatus of claim 1 wherein said generated signal emissions are synchronized with said data processor signal emissions with respect to amplitude.

6. The apparatus of claim 1 wherein said data processor includes a processor, said processor comprising at least one component that produces emissions containing said data processor data, and said generating means comprises circuit components at least a portion of which are identical to said at least one processor component.

7. The apparatus of claim 1 wherein said data processor includes a visual display unit, said visual display unit comprising at least one component that produces emissions containing said data processor data, and said generating means comprises circuit components at least a portion of which are identical to said at least one visual display unit component.

8. The apparatus of claim 1 wherein said data processor includes a disk drive, said disk drive comprising at least one component that produces emissions containing said data processor data, and said generating means comprises circuit components at least a portion of which are identical to said at least one disk drive component.

9. Apparatus for preventing the remote detection and decoding of signal emissions from a data processor having a processor means to discover data being processed by said data processor, said apparatus comprising:
- means coupled with said data processor for generating signal emissions which emulate said data processor signal emissions, said generated signal emissions having identical spectral signatures with respect to amplitude and frequency components versus time as said data processor signal emissions, said generating means comprising circuitry which is identical to circuitry of said processor means that produces emissions containing said data processor data;
- control means coupled with said generating means for synchronizing said generated signal emissions with said data processor signal emissions;
- means coupled with said generating means for randomizing said generated signal emissions and said data processor signal emissions together producing a composite signal which is not decodable to discover said data processor data; and
- amplifier means coupled with said generator means for increasing the amplitude of said generated signal emissions.

10. The apparatus of claim 9 wherein said generating means comprises circuit components at least a portion of which are identical to circuit components of said data processor that produce emissions containing said data processor data.

11. The apparatus of claim 9 wherein said generated signal emissions are synchronized with said data processor signal emissions with respect to at least one of time, frequency and amplitude.

12. The apparatus of claim 9 further comprising interface means coupled with said control means for receiving timing signals from said data processor for providing said synchronization.

13. The apparatus of claim 9 wherein said randomizing means comprises a random sequence generator circuit.

14. The apparatus of claim 9 wherein said randomizing means comprises a data processor program.

15. Apparatus for preventing the remote detection and decoding of signal emissions from a data processor having a visual display unit to discover data being processed by said data processor, said apparatus comprising:
- an emulation generator coupled with said data processor for generating signal emissions which emulate said data processor signal emissions, said generated signal emissions having identical spectral signatures with respect to amplitude and frequency components versus time as said data processor signal emissions, said emulation generator comprising circuitry which is identical to circuitry of said visual display unit that produces emissions containing said data processor data;
- a control circuit coupled with said emulation generator for synchronizing said generated signal emissions with said data processor signal emissions;
- an interface coupled with said control circuit for receiving timing signals from said data processor for providing said synchronization; and
- a random sequence generator coupled with said emulation generator for randomizing said generated signal emissions, said generated signal emissions and said data processor signal emissions together producing a composite signal which is not decodable to discover said data processor data.

16. A method for preventing the remote detection and decoding of signal emissions from a data processor to discover data being processed by said data processor, said method comprising:
- generating signal emissions in proximity to said data processor which emulate said data processor signal emissions, said generated signal emissions having identical spectral signatures with respect to amplitude and frequency components versus time as said data processor signal emissions, wherein said generated signal emissions are generated by an emulation generator having circuitry identical to circuitry of said data processor that produces said data processor signals;
- synchronizing said generated signal emissions with said data processor signal emissions; and
- randomizing said generated signal emissions, said generated signal emissions and said data processor signal emissions together producing a composite signal which is not decodable to discover said data processor data.

17. The method of claim 16 further comprising increasing the amplitude of said generated signal emissions.

18. The method of claim 16 further comprising receiving timing signals from said data processor for providing said synchronization.

19. The method of claim 16 wherein said generated signal emissions are synchronized with said data processor with respect to at least one of time, frequency and amplitude.

* * * * *